United States Patent
Goodrich

[15] 3,634,959
[45] Jan. 18, 1972

[54] MOTION DISPLAY UTILIZING MOIRE PATTERNS

[72] Inventor: Gordon W. Goodrich, Grand Rapids, Mich.

[73] Assignee: Lear Siegler, Inc.

[22] Filed: Nov. 17, 1969

[21] Appl. No.: 877,385

[52] U.S. Cl..............................40/106.53, 340/27, 356/169
[51] Int. Cl................................................G09f 13/36
[58] Field of Search.......................340/27 NA, 27 AT; 40/32, 106.51–106.54,
40/132 F; 356/169

[56] References Cited

UNITED STATES PATENTS

| | | | |
|---|---|---|---|
| 3,153,111 | 10/1964 | Barber et al. | 356/169 |
| 3,244,063 | 4/1966 | Lawrence | 356/169 |
| 3,176,265 | 3/1965 | Schweighofer | 340/27 AT |
| 3,505,750 | 4/1970 | Yates | 40/106.53 |
| 3,382,351 | 5/1968 | Schweighofer | 340/27 NA |

Primary Examiner—Robert W. Michell
Assistant Examiner—Richard Carter
Attorney—Wilfred O. Schmidt

[57] ABSTRACT

A motion indicator utilizing light interference patterns developed by two overlapping, movable transparent endless belts each having a pattern thereon. One belt is entirely mounted within the other for angular as well as translational movement with respect to the other belt, a driven rotation plate mounting the inner belt. The angular rotation of the two belts alters the size and spacing of the resulting interference moire squares, creating the illusion of an approach to or a retreat from the surface "marked" by the interference squares.

To accurately control the translational angular movement of the belts, a conventional feedback system utilizing followup potentiometers is included with all three of the drive motors. The potentiometer and the motor controlling the inner belt are mounted on a single shaft.

11 Claims, 6 Drawing Figures

| MOTION OF | | APPARENT MOTION OF DISPLAY |
|---|---|---|
| OUTER TAPE | INNER TAPE | |
| → | STATIONARY | ↓ |
| ← | STATIONARY | ↑ |
| STATIONARY | ↑ | ← |
| STATIONARY | ↓ | → |
| → | ↑ | ↙ |
| IMMATERIAL | ROTATING CW 0°-45° | SQ SIZE DECREASES |
| IMMATERIAL | ROTATING CCW 45°-0° | SQ SIZE INCREASES |

INVENTOR.
GORDON W. GOODRICH

INVENTOR
GORDON W. GOODRICH
BY
W. Schmidt

MOTION DISPLAY UTILIZING MOIRE PATTERNS

BACKGROUND OF THE INVENTION

Motion indicator devices in the past have utilized interacting patterns which visually suggest by means of the pattern a direction of motion as well as the speed in motion in that direction. An example of such a device is illustrated in U.S. Pat. No. 3,176,265 wherein striped endless belts are utilized. But devices such as these have heretofore been unable to produce a display of perspective or of depth.

This invention basically relies on the principle that fringes representing a light interference pattern may be produced by crossed diffraction gratings. These fringes are commonly known as moire fringes and the line patterns forming the diffraction gratings are known as dot screen or bar and space patterns. Relative movement between crossed, transparent diffraction gratings creating moire patterns is known to indicate movement within a plane and this principle has been heretofore successfully utilized in both linear measurement and direction displays.

SUMMARY OF THE INVENTION

This invention relates to a motion indicator utilizing moire fringes created by crossed pattern screens so as to display in addition to the conventional display of linear movement, the impression of change of depth or perspective. Specifically, it has been discovered that when transparent sheets having certain repeat patterns, e.g., equally spaced dots, are overlayed and rotated relative to each other, the size of the resulting moire squares and their spacing will continually vary to provide a visual display indicating depth, altitude or perspective. In utilizing this discovery, the invention provides a motion indicator comprising a frame of reference, means for creating a translatable light interference pattern, means for translating the pattern with respect to the frame, and means for altering the size of the pattern in response to an angular rotation input to the indicator. The creating means and translating means include a first and a second endless transparent belt, each of which has imprinted thereon a dot pattern, said translating means includes means for driving said belts in either direction, and said altering means includes means for angularly orienting one belt with respect to the other.

Accordingly, it is an object of the invention to provide a motion indicator and a process for displaying, by the use of the same means, a change in depth perception or perspective as well as a change in linear motion and/or direction.

It is another object of the invention to provide a motion indicator and process of the above character wherein a simplified construction is utilized to reduce manufacturing costs.

Other objections and advantages will become apparent upon reference to the following drawings and detailed discussion.

DESCRIPTION OF THE PREFERRED EMBODIMENT

Figures 1, 6:
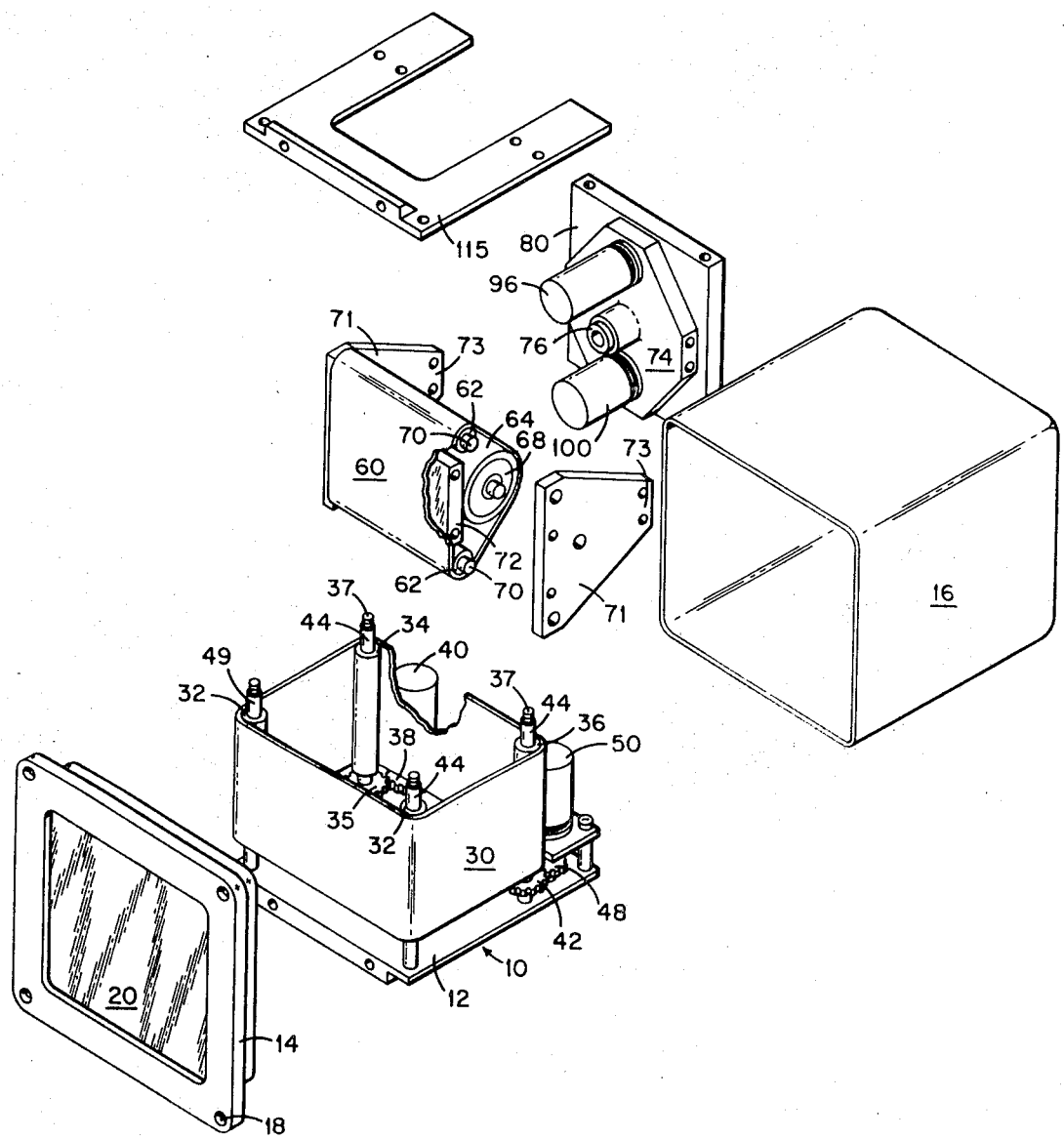
FIG. 1 is an exploded perspective view of a motion indicator constructed in accordance with the invention.
FIG. 6 is a table illustrating the different types of displays available by altering the relative motion of the two endless belts.

This invention concerns a motion indicator display which can be utilized in aircraft or any other vehicle to indicate both movements in a fixed plane as well as a change of depth perception or perspective. If utilized in an aircraft, the change in depth perception would be a direct indication in a change of altitude, the display accomplishing this by an illusion of the approach of the display to a solid object. To mount the motion indicator in such a vehicle, a frame 10 comprising a baseplate 12, a front panel 14, and a casing 16, are mounted in the instrument panel by means of boltholes 18. The front panel 14 has a viewing window 20 and the entire front panel constitutes the frame of reference for viewing the display created by the invention.

Figure 5:
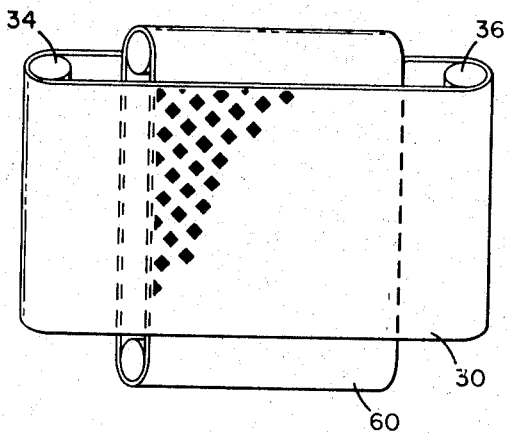
FIG. 5 is a view similar to FIG. 4 but showing the endless belts generating the light interference pattern in a different angular orientation.
Figure 4:
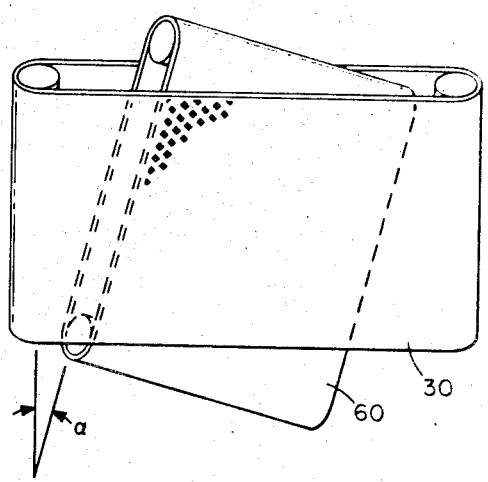
FIG. 4 is a schematic perspective view illustrating the generation of the moire light interference pattern.

In accordance with the invention, two surfaces comprising two endless belts 30 and 60 of at least translucent material have conventional screen patterns comprising equally spaced dots imprinted or otherwise formed thereon, the size of the dots being constant over each belt. The effect of these dot screens, when overlapped, is to create a light interference pattern which resembles in general squares equally spaced from each other. As shown in FIGS. 4–6, the angular orientation of the two belts determines the size and the spacing of the dots, the preferred value for the angle "alpha" (FIGS. 4 and 6) being between 0° and 45°, or between 45° and 90°. When the angle "alpha" is equal to 0° or to 90°, the squares blow up in size and spacing, while when angle "alpha" equals 45°, the squares essentially disappear. It will readily be appreciated that when the angle "alpha" is changed in a gradual sequence, the squares get larger or smaller in their spacing and size so as to create the illusion of approaching or receding, respectively, the surface represented by the squares. The details concerning the specific operation to achieve the effects of the table of FIG. 6 are hereinafter explained.

Figure 2:
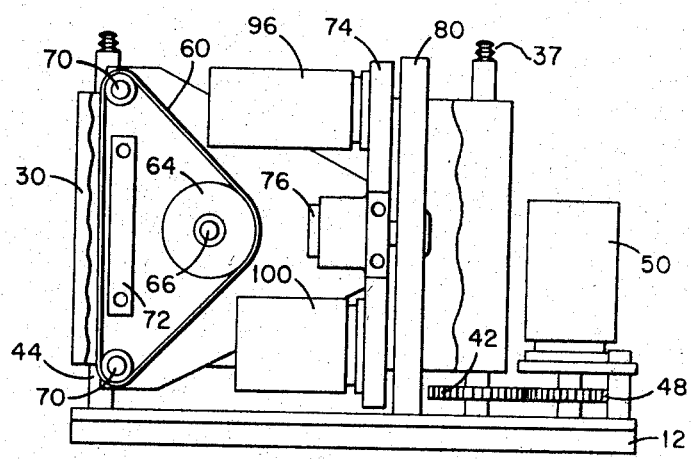
FIG. 2 is a fragmentary elevational view, partially in section and partly broken away, depicting the assembled relationship of the parts of the motion indicator.

To obtain the results schematically illustrated in FIGS. 4–6, the belt 30 as shown in FIGS. 1 and 2 moves over two idler rollers 32, over a drive roller 34, and over a feedback roller 36. All of these rollers are rotatably mounted on shafts 37 which are fastened, such as by screws to the baseplate 12. The drive roller 34 is actuated by gears 35 and 38 in a conventional manner, the gear 38 being reversibly driven by a conventional variable-speed drive motor 40. To control the speed of motion of the belt 30 as caused by the reversible motor 40, a signal is fed back to the motor 40 as follows. A speed-detecting gear 42 is mounted on the shaft 44 for the idler roller 36. A gear 48 is driven by the gear 42 and drives a potentiometer 50 which develops a signal which is compared with the desired output, there being conventionally produced a correction signal in case of a discrepancy which is then delivered to the motor 40. Such a servosystem is conventional and by itself does not constitute the invention. Accordingly, further description is not included.

The second belt 60 moves over idler rollers 62 and is driven by a roller 64, the roller 64 being rotatably mounted on a stationary shaft 66. Contained within the roller 64 is a conventional combined variable-speed motor and potentiometer 68, both of which are mounted around the shaft 66. As in the case with the potentiometer 50, the potentiometer comprising part of the combination 68 is physically actuated in accordance with the speed which the roller 64 is operating about the shaft 66 and delivers a signal which is conventionally compared with the desired rotational speed, any correction being supplied as a feedback signal to the motor. The rollers 62 are mounted on shafts 70, the shafts 66 and 70 being journaled in end plates 71. Also mounted on the end plate 71 is a source of illumination comprising a lamp block 72 positioned inside the path and the location of the belt 60. The block 72 occupies essentially the same area as is presented by the belt 60 to the belt 30 in its overlapping relationship. By its position, the block backlights the produced moire pattern.

Figure 3:
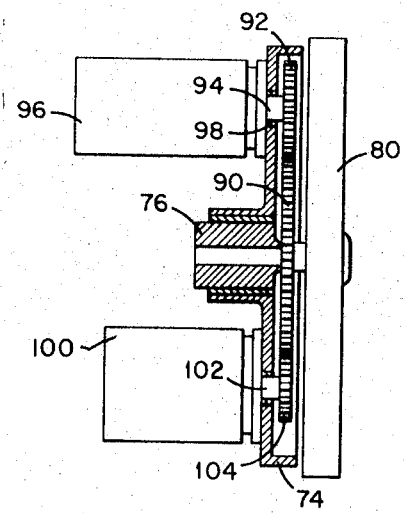
FIG. 3 is an enlarged fragmentary sectional view, partly broken away, of a portion of the device illustrated in FIG. 2.

To annularly orient the belt 60 with respect to the belt 30, the end plates 71 are bolted to a rotation plate 74 at their ends 73, the rotation plate 74 being journaled on a stub shaft 76 which is fixedly mounted to a vertical plate 80 by any convenient means (see FIG. 3). To annularly rotate the plate 74 with respect to the frame 10, any conventional means may be utilized, the mechanism illustrated in FIG. 3 comprising a sun gear 90 fixed to the stub shaft 76 such as by splines, and a planet gear 92 fixedly mounted on the drive shaft 94 of a conventional variable-speed drive motor 96. The drive shaft 94 is rotatably mounted in the plate 74 by means of the bearings 98. It will be readily appreciated that when the motor 96 is activated, the planet gear 92 walks around the stationary sun gear 90, thereby causing the plate 74 to rotate. To accurately control the amount of rotation of the plate 74, a feedback system comprising a potentiometer 100 mounted on the plate 74 is driven by a shaft 102 which in turn is driven by a second planet gear 104, the driving of the shaft 102 measuring the angular rotation of the rotation plate 74 about the gear 90. This sets up a signal in the potentiometer which is compared with the desired amount of rotation, and a correctional signal is conventionally delivered to the motor 96 as a result of the comparison.

To mount the belt 60 and the rotation plate 74 within the confines of the belt 30, the plate 80 is fixed to the baseplate 12 (FIG. 2).

The entire mechanism as mounted on the baseplate 12 has a cover plate 115 fastened down over it, and the casing 16 is placed around the assembled item.

OPERATION

It will be readily appreciated that the motors 40, 68 and 96 are reversible and variable speed, so that the moire pattern generated by the overlapping belts can be translated in any linear direction which can be altered in a continuous manner and at a variable speed, and that the inner belt 60 can be angularly rotated in either direction with respect to the outer belt 30. Specifically, the preferred angular orientation of the two belts maintains the angle "alpha" (FIG. 4) between 0° and 45°. The display which is obtainable within this orientation is illustrated in FIG. 6, the first four lines being for an angle "alpha" between 0° and 45°. If only one of the two endless belts is driven, the motion obtained on the display is as indicated in the first four rows of FIG. 6, the magnitude of the motion being directly proportional to the speed of movement of the belt being driven. If both belts are driven, the resultant direction of motion of the display is directly proportional to the ratio of the belts' speed, the magnitude of the resultant movement being the vector sum of the movement of the two belts (as shown in the fifth line of FIG. 6). As is obvious to one skilled in the use of moire patterns, the first five rows of the table of FIG. 6 will be reversed in result if the angle "alpha" is maintained between 45° and 90°.

The display of the change in depth perception is indicated in the last two lines of FIG. 6 wherein the spacing and the size of the squares decrease as the angle "alpha" is varied from 0° to 45° when the belt 60 is rotated with respect to the belt 30. This is also depicted in FIGS. 4 and 5, the value of "alpha" having been reduced to almost zero in FIG. 5, thereby increasing the size and spacing of the moire squares. If "alpha" is varied from 45° to 0°, the size and the spacing of the squares of the moire fringes increase. This variation in size and spacing is proportional to the change in depth being sensed by the display, and will occur regardless of the linear motion of either of the two belts since the depth change display is superimposed upon the apparent linear motion of the display. Thus it is possible to display a translational motion as well as a change in the altitude or the depth perception at the same time.

Although the invention has been described by reference to the preferred embodiment, it will become apparent that changes can be made which will be in keeping with the scope of the invention. Any uniform screen pattern can be utilized in belts 30 and 60, so long as they create when overlapped a light interference pattern that alters in size and spacing with the angular rotation of one belt with respect to the other.

The embodiments of the invention in which an exclusive property or privilege is claimed are defined as follows:

1. A motion indicator for indicating at least two functions by apparent motion, said indicator comprising:
   a housing;
   a first light-transmittable surface;
   means for mounting said first light-transmittable surface for movement along a first path within said housing means for moving said first surface in response to a first function;
   a second light-transmittable surface mounted within said housing in a parallel plane overlapping said first light-transmittable surface; means for mounting said second surface for movement in a path angularly disposed to said first path;
   means for adjustably moving said second light-transmittable surface along a second path angularly disposed with respect to said first path responsive to a second function;
   said first and second light-transmittable surfaces having screen patterns thereon such that a light interference fringe pattern results when light passes through said first and second light-transmittable surfaces; said fringe pattern giving the appearance of motion in one direction when said first surface is moved with respect to said second surface along said first path; and said fringe pattern giving the appearance of motion in a second direction when said second surface is moved with respect to said first surface along said second path; and
   illuminating means mounted behind said first and second light-transmittable surfaces for transmitting light therethrough;
   whereby said apparent motion of said fringe pattern in said first and second directions indicates said first and second functions.

2. A motion indicator according to claim 1 wherein said first light-transmittable surface comprises a continuous belt mounted for continuous movement along said first path.

3. A motion indicator according to claim 2 wherein said second light-transmittable surface comprises a continuous belt mounted for continuous movement along said second path.

4. A motion indicator according to claim 3 wherein said second surface continuous belt is mounted within the loop of said first surface continuous belt.

5. A motion indicator according to claim 3 and further comprising means for driving said first and second surface continuous belts, means for detecting the speed of movement of said first and second surface belts and for generating signals responsive thereto, and means for applying said signals to said driving means for said first and second surface belts as a corrective signal to control the speed of said belts.

6. A motion indicator according to claim 1 wherein said second surface angular rotation means includes a plate rotatably supported within said housing and mounting said second light-transmittable surface; a sun gear fixedly mounted within said housing adjacent said rotatably supported plate and concentric with the axis of rotation of said plate; a planet gear rotatably mounted on said plate and engaging said sun gear; and means for driving said planet gear to rotate said plate with respect to said sun gear.

7. A motion indicator according to claim 6 and further comprising means for detecting the angular relationship of said rotatably mounted plate with respect to said sun gear and for developing a signal responsive thereto; means for applying said signal to said planet gear driving means as a corrective signal to control the position of said plate with respect to said planet gear.

8. A motion indicator according to claim 1 wherein said screen patterns are diffraction gratings which are crossed with respect to each other.

9. A motion indicator comprising a viewing window, a base, means for mounting said window with respect to said base, a first plurality of rollers journaled in an upright position to said base, a first endless belt mounted upon said first rollers and having a surface thereof passing said window, a plate mounted upright upon said base and within said first belt, a second plurality of rollers rotatably mounted upon said plate within said first belt, a second endless belt mounted upon said second rollers, said second belt having a surface passing behind said surface of said first belt, means for driving each of said belts with respect to each other, and means for adjustably angularly orienting said second belt with respect to said first belt; said first and second belts being light transmittable and having a screen pattern thereon such that a light interference fringe pattern results when light passes through said first and second belts; and illuminating means behind said surfaces of said first and second belts for transmitting light therethrough to be viewed at said window.

10. The motion indicator as defined in claim 9, wherein said driving means includes a motor contained within one of said second rollers.

11. The motion indicator as defined in claim 9, wherein said orienting means is rotatably mounted upon said plate within said first belt.

* * * * *